United States Patent
Olkin et al.

(10) Patent No.: US 7,457,958 B2
(45) Date of Patent: *Nov. 25, 2008

(54) SYSTEM FOR DETECTING AUTHENTIC E-MAIL MESSAGES

(75) Inventors: Terry M. Olkin, Los Gatos, CA (US); Jeffrey C. Olkin, Woodside, CA (US); Jahanshah Moreh, Beverly Hills, CA (US)

(73) Assignee: Proofprint, Inc., Sunnyvale, CA (US)

( * ) Notice: Subject to any disclaimer, the term of this patent is extended or adjusted under 35 U.S.C. 154(b) by 485 days.

This patent is subject to a terminal disclaimer.

(21) Appl. No.: 10/711,494

(22) Filed: Sep. 21, 2004

(65) Prior Publication Data

US 2005/0076221 A1  Apr. 7, 2005

Related U.S. Application Data

(60) Provisional application No. 60/481,407, filed on Sep. 22, 2003.

(51) Int. Cl.
   *H04L 9/00* (2006.01)
   *H04L 9/32* (2006.01)
(52) U.S. Cl. .............. 713/176; 713/177; 713/178; 713/179; 713/180; 713/181; 380/30; 726/2; 726/3; 726/4; 726/5; 726/6
(58) Field of Classification Search .............. 713/176
   See application file for complete search history.

(56) References Cited

U.S. PATENT DOCUMENTS

| | | | |
|---|---|---|---|
| 6,314,409 B2 | 11/2001 | Schneck et al. | 705/54 |
| 6,606,709 B1* | 8/2003 | Connery et al. | 726/14 |
| 6,728,378 B2* | 4/2004 | Garib | 380/259 |
| 6,766,369 B1* | 7/2004 | Haitsuka et al. | 709/224 |
| 2002/0199119 A1* | 12/2002 | Dunnion et al. | 713/201 |
| 2004/0078422 A1 | 4/2004 | Toomey | 709/202 |

\* cited by examiner

*Primary Examiner*—Longbit Chai
(74) *Attorney, Agent, or Firm*—Patent Venture Group; Raymond E. Roberts

(57) ABSTRACT

A system (50, 150) for assisting a user (14) to determine whether an email (18) comes from a purported originator (16). A computerized system having a display unit is provided. Logic (54) in the computerized system determines whether the email (18) includes an authenticity mark (52) including an originator identifier (102) and encrypted data (104). Logic (54) in the computerized system then decrypts the encrypted data (104) into decrypted data (108-14), based on the originator identifier (102). Logic (54) in the computerized system then presents to the user (14), on the display, whether the email (18) includes the authenticity mark (52), whether the encrypted data (104) decrypts successfully, and information based on the authenticity mark (52) and the decrypted data (108-14).

34 Claims, 6 Drawing Sheets

SYSTEM FOR DETECTING AUTHENTIC E-MAIL MESSAGES

CROSS-REFERENCE TO RELATED APPLICATIONS

This application claims the benefit of U.S. Provisional Application No. 60/481,407, filed Sep. 22, 2003 and hereby incorporated by reference in its entirety.

TECHNICAL FIELD

The present invention relates generally to electronic communications, and more particularly to securing email and other message forms including hyperlinks.

BACKGROUND ART

The use of spoofed hyperlinks has recently grown to the point that it is undermining many desirable forms of electronic communications. In this discussion, spoofing of uniform resource locators (URLs) in email messages is used as a primary example, but this is not the only example of this growing problem and the discussion provided here should not be interpreted as restrictively applying only to email.

One of the biggest problems now preventing email from becoming a legitimate means of business communications is email message spoofing. A spoofed email message is one that appears to the receiver to have come from a perfectly legitimate source, usually a reputable individual, firm, or company. Furthermore, an email, spoofed or otherwise, but typically spoofed, can includes one or more spoofed hyperlinks. Such spoofed hyperlinks (links) can lead the receiver of the email down a path, typically to a spoofed web site, such that the email recipient is asked to reveal some "important" data, usually personal data like a social security number, account number, personal identification number (PIN), etc. Since the email, the URL (i.e., the hyper link, or "link"), and the supporting web site all appear outwardly to be completely authentic (sometimes even including the use of images stolen right from a legitimate entity's web site), the email recipient is usually completely unaware of what is going on.

FIG. 1 (background art) is a block diagram depicting a representative spoofing scheme 10. There are three parties 12 involved here: a customer, client, or user (user 14) whom we are trying to protect; a trusted firm or organization (organization 16) that wants to use an electronic communication or email message (email 18) for business communications without worrying about spoofing; and an attacker or spoofer (spoofer 20) who sends a spoofed email 22 in an attempt to elicit a response 24 from the user 14 to learn personal data or confidential information (information) for malicious purposes.

The parties 12 each use appropriate computerized devices to send and receive the email 18, spoofed email 22, and response 24. For example, the organization 16 may use computerized workstations or terminals and a server; the user 14 may use a personal computer (PC) or personal digital assistant (PDA), and the spoofer 20 may use a PC and a server. For the sake of simplification we herein treat the parties 12 and the hardware they use as synonymous.

The trusted organization 16 has a business relationship with its users 14 and may or may not have used email to previously communicate with them. FIG. 1 shows an organization user path 26 for conventional email 18, as well as a user-to-organization path 28 for a user's requested action, typically initiated by the user 14 following a URL to the web site of the organization 16.

The problem is that the spoofer 20 can send the spoofed email 22 to the user 14 via an undetected spoofer-to-user path 30, and this spoofed email 22 can include a spoofed link to a spoofed web site. Upon receipt of such a spoofed email 22, the user 14 may respond under the assumption that it is the organization 16 that is requesting information. However, rather than the response from the user 14 proceeding via the intended user-to-organization path 28, by following the spoofed link the user 14 proceeds via an unintended user-to-spoofer path 32 to a spoofed web site of the spoofer 20. Unaware of the deceptive tactics being employed, the user 14 may then divulge information at this spoofed web site that would not otherwise be shared with the spoofer 20.

A recent example of this involved a large U.S. bank, its customers in the U.S. and spoofed emails with links that led to a computer server listed in Internet IP address databases as belonging to a futures trading company in China. The spoofed emails appeared to be from the U.S. bank, including original trademark logos and other images that were actually linked in via HTML code from the U.S. bank's own web servers in the continental United States. The spoofed emails informed the receivers that there had been a change in the bank's terms and conditions related to their accounts, and invited them to click a link to view the new terms and conditions. The link in these spoofed emails, however, led to the server in China rather than to the U.S. bank's website on a server in New York. These spoofed emails were sent to at least thousands of people, most of whom did not even have accounts with the bank and who simply deleted them. Unfortunately, many people who were the customers of the U.S. bank, probably numbering at least in the hundreds, received and clicked on the link in these spoofed emails.

The text labeling of this link read "Click here to access our terms and conditions page . . . " while the actual content of the link resembled:

h_r_e_f="h_t_t_p://w_w_w.SomeBank.c_o_m:
       ac%398HAAA9UWDTYAZJWVWAAA
       A9pYWwgc216Z-T00PjxTVgc216ZT00Pjx
       T3Aac%398HAAA9UWDTYAZJWVWAAAA
       9pYWwgc216ZT00PjxTVgc216Z-
       T00PjxT@200.0.0. 0/c_g_i-b_i_n/s.
       pl?m=receiver@isp.c_o_m"

The link thus overtly contained the U.S. bank's web address, but actually covertly linked to a server at the IP address 200.0.0.0 (changed here from the actual IP address used), and worked to send the receiver's email address (e.g., receiver@isp.com) when the link was clicked. With this alone, the spoofer learned the email addresses of receivers who likely had accounts with the U.S. bank, as well as the fact that those particular receivers would easily rely on spoofed emails. Furthermore, once such a naive receiver clicked on the link and arrived at IP address 200.0.0.0, they could be greeted with a request for private information, such as: "So we can determine your account type and present the specific terms and conditions applicable for it, please enter your account number."

As can be appreciated from this single example, spoofing can employ quite sophisticated social engineering and poses a serious threat to legitimate companies and firms and to their customers and clients.

Unfortunately, while very serious and constituting a problem approaching epidemic proportion, spoofed emails 22 are merely the most notable current symptom of what is actually a much larger and rapidly growing problem. The hyperlinks in instant messages (IM), web pages, etc. are also subject to spoofing. To facilitate discussing the larger problem here, and the inventor's presently discussed solution, we generically term the medium in which spoofed links appear as "messages."

As messages containing spoofed links are sent to users, the problem becomes how to alert the users to the links in those that are being spoofed. Unfortunately, as can be seen from the email-based message example above, this is often quite difficult because the spoofed links may appear as normal ones, with only extremely detailed analysis of the context they are in allowing the user to uncover aspects which show the link to be a spoofed one.

However, an alternative way to consider the problem here is to flip it over. Rather than ask how can a user know a link is in authentic, ask how can a user know that a link in a message is authentic? This, combined with some education (i.e., if a message does not present itself as being authentic, then it is not) can certainly slow down the spoofing problem. However, this still leaves the problem of how does a message "present" itself as being authentic. Many in this field feel that it will be very difficult to completely eliminate the spoofing problem without a universal secure messaging solution, for instance, a system where every message is digitally signed at origin. However, because signing and verifying every message is cumbersome, there remains a need for a "next best" solution that is both easy to deploy and easy for users to understand.

SUMMARY OF THE INVENTION

Accordingly, it is an object of the present invention to provide a system for detecting authentic e-mail messages.

Briefly, a preferred embodiment of the present invention is a system for assisting a user to determine whether an email comes from a purported originator. A computerized system having a display unit is provided. A logic in the computerized system determines whether the email includes an authenticity mark including an originator identifier and encrypted data. A logic in the computerized system then decrypts the encrypted data into decrypted data, based on the originator identifier. A logic in the computerized system then presents to the user, on the display, whether the email includes the authenticity mark, whether the encrypted data decrypts successfully, and information based on the authenticity mark and the decrypted data.

An advantage of the present invention is that it is well suited for application in electronic communications of e-mail, other message types, of files, and other information.

Another advantage of the invention is that it is both easy to deploy and easy for users to understand, while concurrently providing high security.

Another advantage of the invention is that the only means of infiltrating it using a regular spoofing attack is through human error.

And another advantage of the invention is that even against a sophisticated attack, for instance, where a spoofer attempts to get a user to load their own counterfeit originator identifier to public key mapping, other authenticity checks will reveal inconsistent results and discrepancies to alert the user.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

Figure 1:
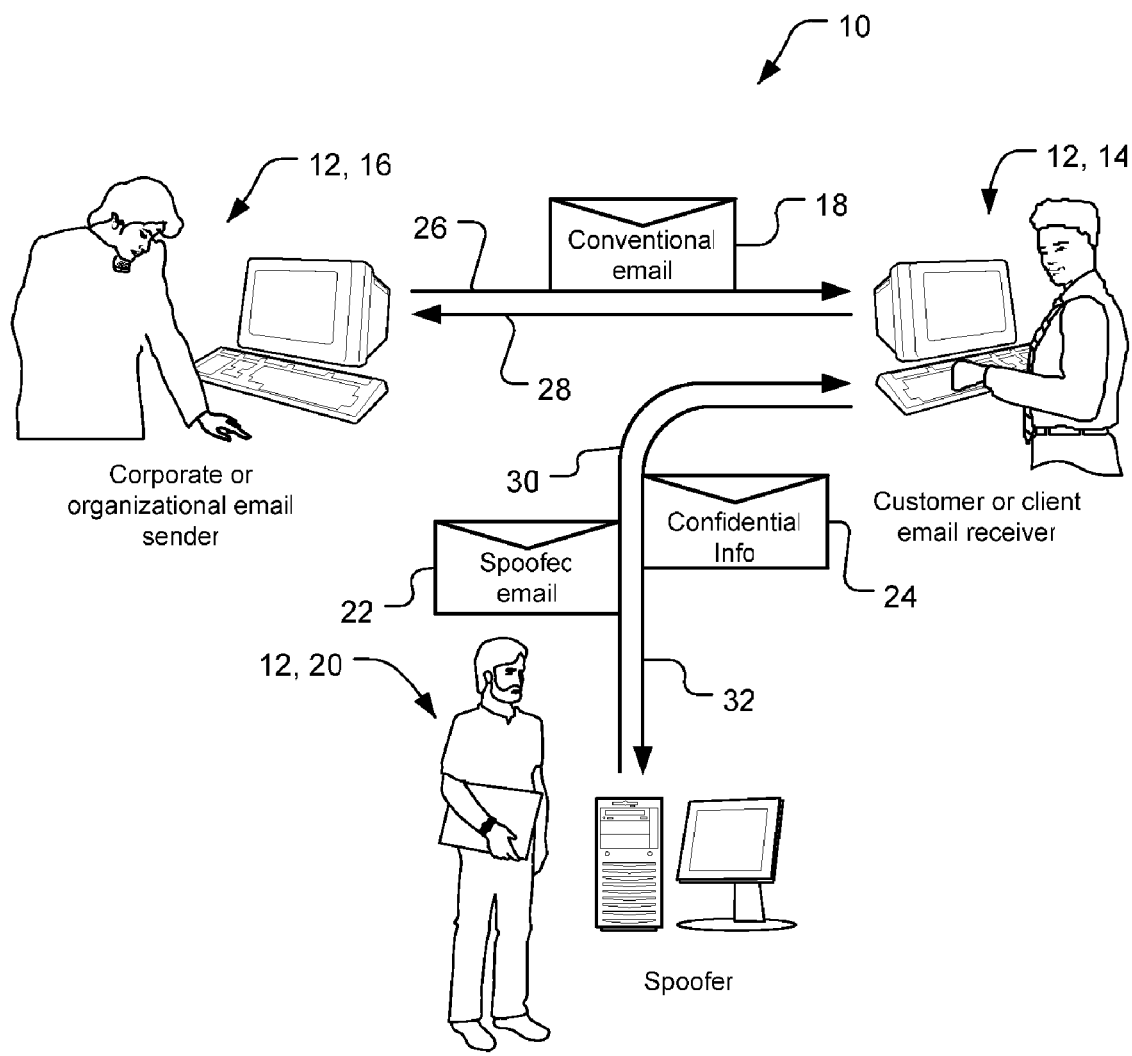
FIG. 1 (background art) is a block diagram depicting a representative spoofing scheme.

A preferred embodiment of the present invention is a system for detecting authentic e-mail messages. As illustrated in the various drawings herein, and particularly in the views of FIGS. 2 and 5, embodiments of this invention are depicted by the general reference characters 50 and 150.

Figure 2:
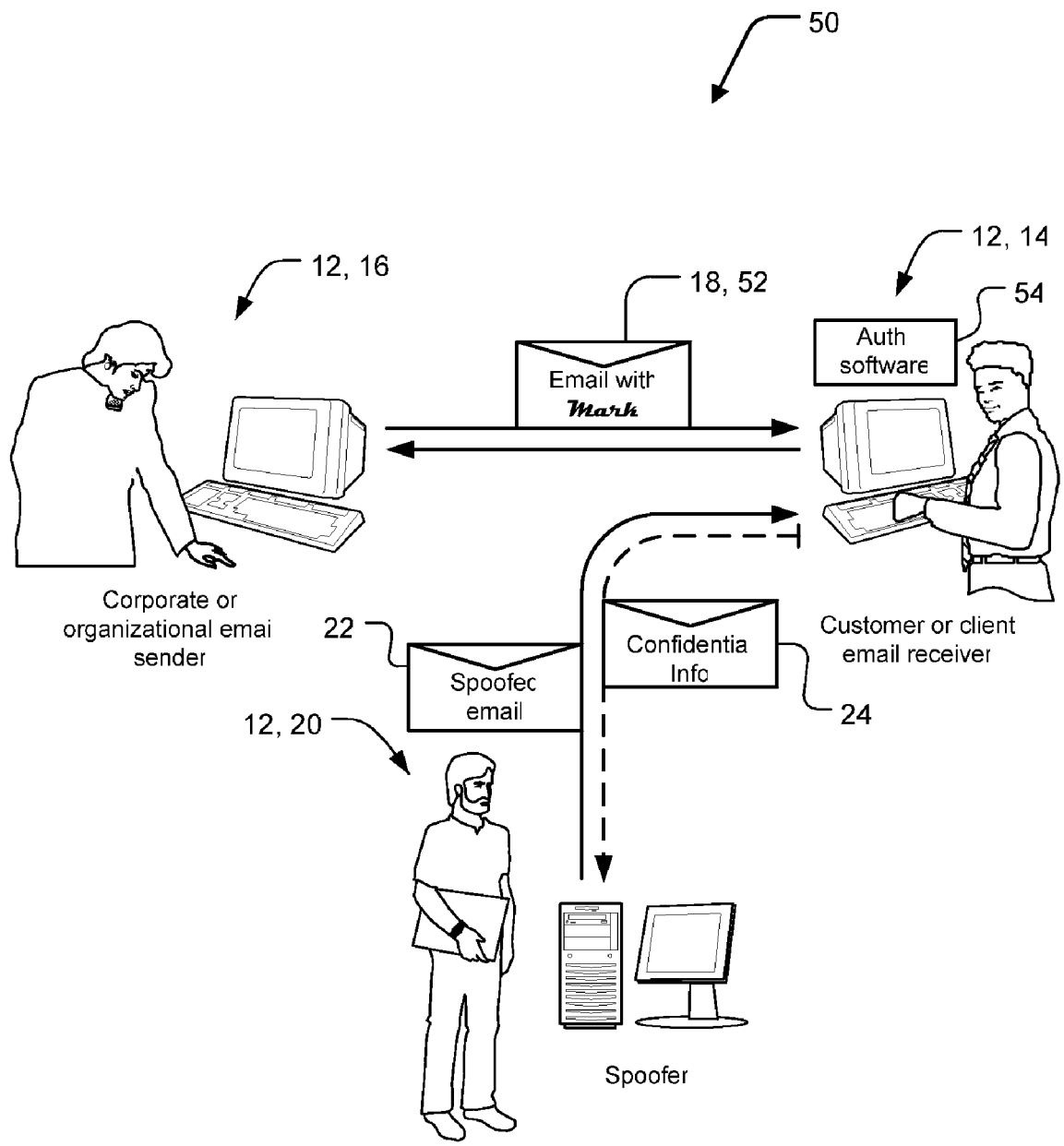
FIG. 2 is a block diagram depicting one anti-spoofing system in an exemplary usage scenario in the context of email.

FIG. 2 is a block diagram depicting one anti-spoofing system 50 in an exemplary usage scenario in the context of email. In the scenario there are three parties 12 involved: a user 14 whom we are trying to protect, an organization 16 that wants to use email 18 for communications without worrying about spoofing, and a spoofer 20 who sends a spoofed email 22 in an attempt to elicit a response 24 from the user 14 and learn information for inappropriate purposes. For now, we focus on the first two parties 12.

The general idea here is that the organization 16 can send out a conventional email 18 including an authenticity mark (mark 52). The presence of the mark 52 then triggers a piece of trusted software (software 54) running on the local machine of the user 14. And this software 54 is then able to determine whether the mark 52 is authentic and to convey that critical information to the user 14.

The anti-spoofing system 50 thus forewarns the user of possible spoofing. It is, however, also essential to properly instruct the end user to take full advantage of the protective nature of the anti-spoofing system 50. The user 14 needs to recognize that when a message appears to come from a trusted organization 16 (or at least one that has advised that it is using this technology), and when the message does not have the mark 52, then the message should be treated as a spoofed email 22 and ignored, deleted, or reported. The user 14 also needs to be educated that when an email (e.g., potentially still a spoofed email) has a mark 52, it should be inspected with the software 54 to determine whether the putative authenticity mark is a true mark 52 or an imitation. Simply put, messages without any form of mark should immediately be considered bad and messages with those with a mark should be further scrutinized to make sure that the mark in them has not been stolen or spoofed.

One of the important aspects of the anti-spoofing system 50 is the software 54 which helps the user 14 to determine authenticity. Ultimately, the user 14 needs to trust that this software 54 is an effective tool to use against spoofers 20 and spoofed email 22. This means that the software 54 should preferably come from a known and trusted source. This also means that the software 54 should render its verification results to the user 14 in a way that the result cannot itself be spoofed or easily forged. In particular, what the software 54 displays on the machine of the user 14 should preferably not look anything like a browser window or like anything that can be emulated by a browser window (since a browser window is the easiest software to use remotely as a front). It is also preferable that the software 54 run on the actual local machine of the user 14, since it is much easier for a spoofer 20 to provide a link to a remote site if an authenticity check occurs remotely and this can, of course, be arranged to indicate that the spoofed email 22 is authentic.

How the authenticity checking software 54 is installed is up to each organization 16 that deploys the anti-spoofing system 50. However, standardization can be expected to occur, with multiple organizations 16 adopting the same software. The software 54 then need only be installed once, with other information added easily on the machine of a user 14 on a "per organization" basis for each different organization 16 that the user 14 wants to be able to authenticate. The software 54 can be written in C/C++ to keep its size small and to minimize an installation package that can be downloaded via a secure channel for installation. The entire installation package can also be digitally signed, thus reassuring the organizations 16 adopting the anti-spoofing system 50 of its trustworthiness as well.

The software 54 can run as a "service," and thus always be running. Once the software 54 is installed the service then begins listening, with a further advantage being that it can be started automatically each time that the machine of the user 14 is rebooted. [Another possibility is that the software 54 is triggered under certain conditions and does not always run. This is not the preferred deployment, but is still a perfectly legitimate one.]

With the software 54 running as a service, it can listen at a well-known port on the machine of the user 14. Choosing this port should be done carefully, however, to ensure that it is always available for efficient transactional verifications and authentication of incoming messages. This is not too much of a problem, however, given that few services listen on ports of client machines. The specific port selection can also permit limiting access to the local machine of the user 14, as a further security feature. For example, the service can listen using the non-routable IP address 127.0.0.1. This address cannot be accessed from outside. In fact, because of the way TCP/IP works, even if one knows the port number that the service is listening for at this IP address, another process cannot access that port remotely.

When the software 54 is implemented as a service it can be as a very simple, single task HTTP server that listens for a request to authenticate a mark 52. Assuming the request is well-formed, the service will then easily process the request and display the results to the user 14. Again, the result preferably is displayed in such a way that only locally running software can provide. For instance, the software can provide a dialog box that scrolls up from the task bar, with a non-rectangular shape.

Figure 3:
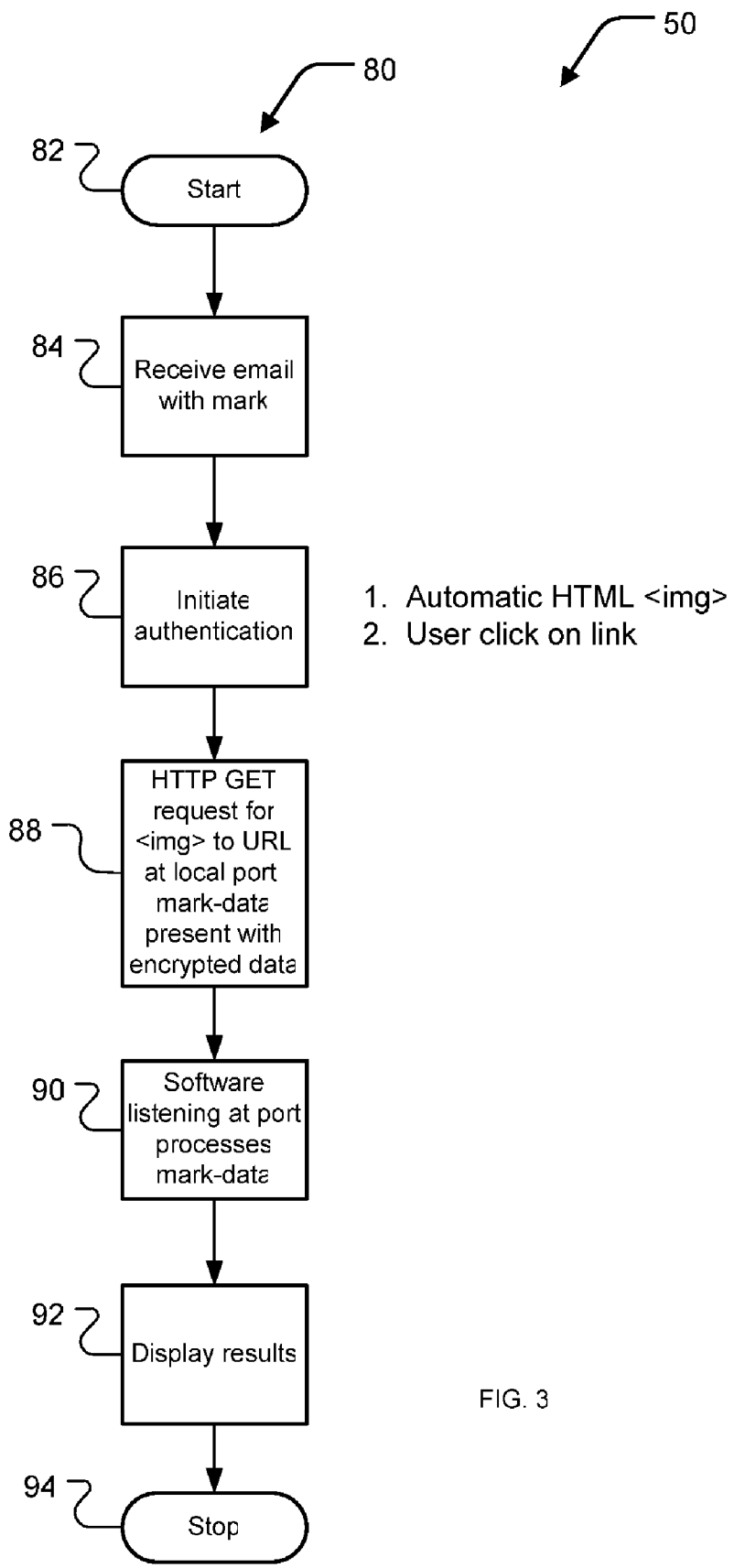
FIG. 3 is a flowchart showing a representative process for what the user experiences using the anti-spoofing system of FIG. 2.

FIG. 3 is a flowchart showing a representative process 80 for what the user 14 experiences using the anti-spoofing system 50 of FIG. 2. The process 80 starts in a step 82, and in a step 84 the user 14 receives an email 18 including an authenticity mark 52 at their local machine.

In a step 86, formal authentication is initiated. Depending on the particular implementation being employed, the user 14 will either need to manually click on a button or a link to authenticate, or authentication will proceed automatically. To proceed automatically, a "link" to the trusted software 54 can be provided as an HTML <img> tag that is automatically received and processed by the email viewer in the machine of the user 14. This automated approach is convenient because it minimizes the time and effort of the user 14.

In a step 88, in the link-based variation used for the sake of example here, an HTTP GET is activated to a URL of the form: http://127.0.0.1:port?mark=mark-data. Here "port" is a well-defined port specifically chosen for the software 54 to use and the "mark-data" includes encrypted data (described presently).

In a step 90, the software 54 running as a service is triggered by the HTTP GET and returns a branded image. The service accordingly processes the mark 52 to determine an analysis result. For this, different organizations can supply their own images specifically for the anti-spoofing system 50 and a particular organization ID can be included in the mark 52 so that the correct image can be returned when more than one choice is possible. The content of the branded image itself is unimportant, since its primary purpose is to satisfy the HTTP GET request. The branded image can, however, be used for additional purposes. For instance, to built user 14 recognition of a trademark of the organization 16.

In a step 92, the software 54 displays its analysis result in the "unforgeable" local window on the machine of the user 14. The user 14 can now simply accept the results (e.g., click on an "OK" button). Of course, a more detailed way to get help can also be provided for when something suspicious is detected.

If the software 54 is not running as a process (e.g., not running as a service or is other software that is not already started), the mark 52 can be passed in an attachment to the email 18. To handle a mark 52 sent in this manner the installed software 54 can be registered for a particular file type (e.g., *.sma for Sigaba Mark of Authenticity), with this being the same as the file type of the attachment then containing the mark 52. In this variation, the body of the attachment is the same mark 52 as described above. The user 14 here simply "opens" the attachment, launching the software 54 to read the mark 52 in the attachment. After that, verification proceeds similarly to the link-based approach already described.

The process 80 stops in a step 94 after the software 54 has determined the authenticity of the email 18, or the lack of such. The user 14 may decide to respond to the email 18 or the software 54 may be configured to automatically delete an inauthentic email 18 (i.e., a spoofed email 22). In sum, the total experience of the user 14 can thus be simplified by displaying verification results and allowing the user 14 to decide whether a message (e.g., an email 18) is truly authentic.

Detecting Authentic Marks

Figure 4:
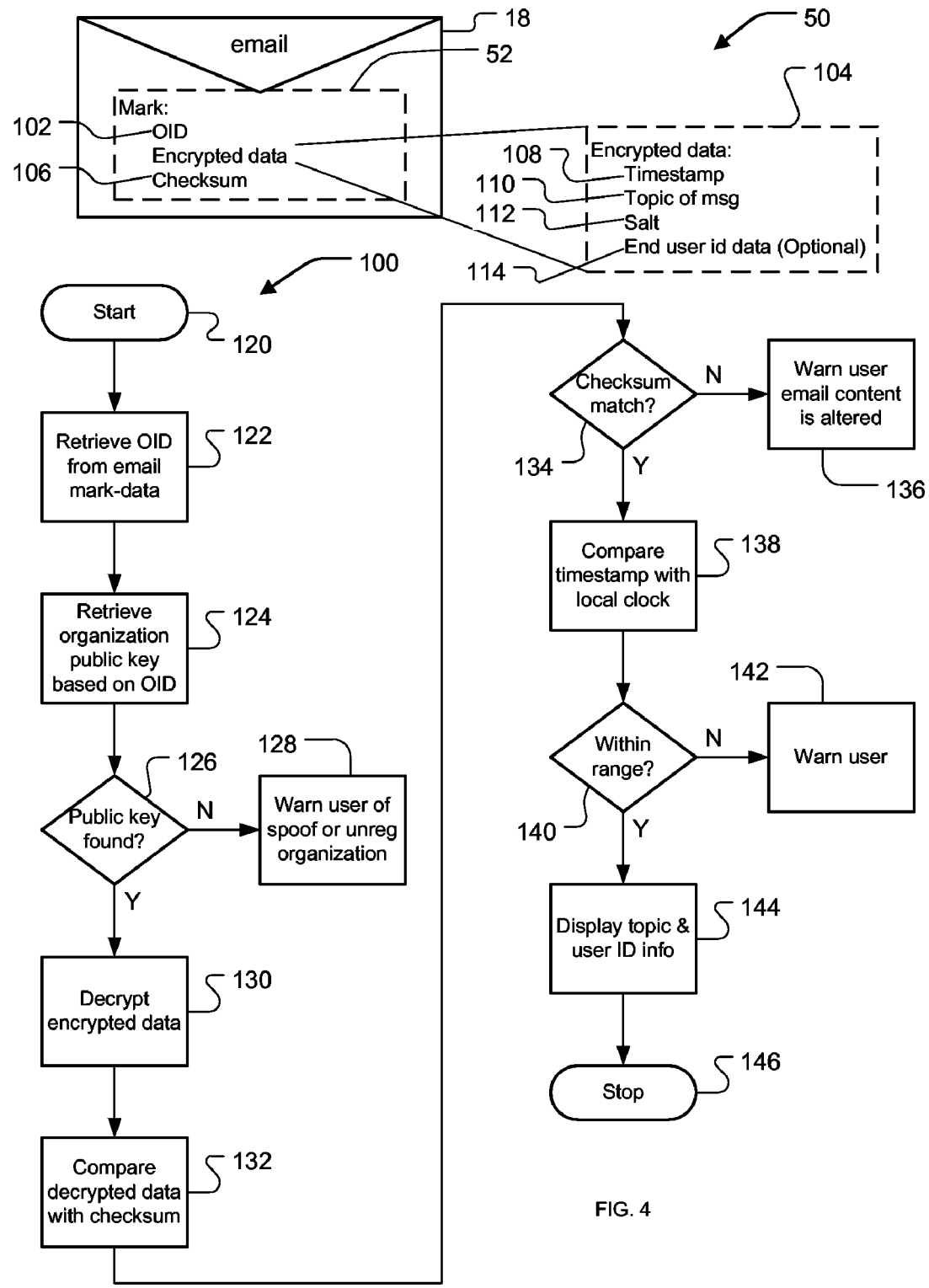
FIG. 4 is a combination block diagram showing elements in an example mark as well as a flow chart showing a decryption process to work with the various data in the mark.

Having provided the above overview, we now describe how this works in more detail. FIG. 4 is a combination block diagram showing elements in an example mark 52 as well as a flow chart showing a decryption process 100 to work with the various data in the mark 52.

Turning first to the block diagram portion of FIG. 4, it depicts how the email 18 includes the mark 52, which in turn, includes an originator identifier (OID 102), encrypted data 104, and an integrity checksum 106.

Each organization 16 can have a unique OID 102, and each will typically create its own unique public/private key pair for encryption and decryption of the encrypted data 104. The organization 16 provides the users 14 with (1) a copy of the software 54, if a user 14 does not already have it; (2) its OID 102; and (3) the particular public key that the organization 16 has designated for message communications. Each user 14 installs the software 54 and stores the OID 102 and respective public key in the registry of their machine (typically) or in a flat file.

The block diagram portion of FIG. 4 also depicts examples of typical encrypted data 104, here including: a timestamp 108 indicating when the message was encrypted, and thus approximately when it was sent; a "topic" of the message (topic 110); a salt 112; and an optional user ID 114. When the trusted software 54 decrypts the encrypted data 104 it then can use the contents as follows.

The timestamp 108 permits comparison with the clock of the local machine of the user 14. If the time difference is outside of a certain range, this can be noted in a dialog with the user 14. However, this does not necessarily signify that anything is actually wrong. For example, it may simply be the case that the local clock is incorrect or that the user 14 is looking back at an authentic message received last week. Alternately, if an email 18 has just arrived but the software 54 is telling the user 14 that it was sent weeks ago, the user 14 should become very suspicious. All of this can alert the user 14 be presenting information so that he or she can determine what the problem is.

Next, the topic 110 contained in the mark 52 can be displayed to the user 14 (e.g., in bold or with other emphasis). To gain full benefit of this the user 14 should be educated to compare the topic 110 with the content of the email 18 itself. The topic 110 can be more than merely a conventional email subject. It can be sufficiently detailed enough so that the spoofer 20 cannot provide a spoofed email 22 under the same topic 110. For example, if the topic 110 is "October 2003 Statement," it would be difficult for a spoofed email 22 that is not a statement to get by, assuming that the user 14 actually compares these, but this is where education comes in.

The salt 112 is essentially conventional, as such is used in the cryptography arts. It is a random number used to strengthen security, and here is more important when end-user identifying data (e.g., the optional user ID 114) is included.

Including the optional user ID 114 makes an attack by a spoofer 20 significantly more difficult. Unfortunately, it also makes sending an authentic email 18 a little more burdensome as well, since each message is now essentially unique and has to be prepared accordingly. For instance, when the user ID 114 is included, a legitimate organization 16 cannot simply bulk mail emails 18.

The user ID 114 can be anything from a random number, to a hash of an account number, to an actual account number. In preparation for this, the user ID 114 can be stored in the registry on the machine of the user 14 at the same time that the OID 102 and its public key mapping are downloaded and stored. The software 54 can then automatically compare the value in the registry with the user ID 114 in the mark 52 in an email 18. If these do not match, the email 18 should be regarded as spoofed.

To send an authentic email 18 the sending organization 16 needs to construct the mark 52 and then include it in the email 18. If the email 18 is formatted as an HTML message the mark 52 can be hidden in an <img> tag (which will also cause the check to happen automatically), or behind a button (which itself can be an image), or as just a regular hyperlink. If the email 18 is formatted as plain text, the link must be included as an actual URL, but most email clients will convert this to a live link. At worst, the user 14 will have to cut and paste the URL into their browser for execution.

As already noted, a slight complexity in preparing and sending the email 18 is presented by whether the optional user ID 114 is included. When not included, the mark 52 need only be computed once and then included in every email 18 being sent. When included, however, the mark 52 has to be computed once for each user 14, and thus will likely involve some kind of lookup operation to determine the proper data for each of the respective users 14. This data can be based on existing user information (e.g., name, account, etc.), which has the advantage that it does not require any additional storage requirements for the sending organization 16.

Turning now to the flow chart portion of FIG. 4, it summarizes much of what has just been stated. The decryption process 100 starts in a step 120, where an email 18 has been received at the machine of the user 14 and the mark 52 from it has been received by the software 54.

In a step 122, the software 54 extracts the OID 102 from the mark 52, and in a step 124 uses it to try to retrieve an associated key for the organization 16. In a step 126 a determination is made whether a key was retrieved. If not, e.g., if no entry for the OID 102 exists, in a step 128 the user 14 is warned that the present email 18 could be a spoof, altered, or from a legitimate organization 16 but one for which the user 14 has not been setup or correctly registered.

Otherwise, in a step 130 the software 54 decrypts the encrypted data 104, and in a step 132 compares the email 18 with the checksum 106. In a step 134 a determination is made whether there is a match. If not, in a step 136 the user 14 is warned that the present email 18 has been altered.

In a step 138 the software 54 compares the timestamp 108 and in a step 140 a determination is made whether the difference between the timestamp 108 and the clock of the machine of the user 14 are within a preset range. If not, in a step 142 the user 14 is warned of this.

In a step 144 the topic 110 and, optionally, the user ID 114 are displayed to the user 14. The user 14 now has the information that he or she needs to make an informed decision about the email 18. And in a step 146 the process 100 is finished.

There are two broad classes of attacks that the anti-spoofing system 50 can address. The first, most obvious and easiest, is for a spoofer 20 to do what spoofers do now: simply send legitimate looking spoofed emails 22. This approach relies completely on the lack of education by end users 14. In this case, even when the authenticity checking software 54 is installed it will not be triggered. So the users 14 must be cognizant of this negative indicator, which can be tricky. This comes down to education. If the users 14 expect an authenticity dialog to appear, then they will notice when it does not.

The other class of attack is actually trying to spoof the authenticity mark 52. Since we know that data 104 in it cannot be altered due to the power of cryptography (and we here ignore the case where a private key of a legitimate organization 16 is compromised), the only other option for a spoofer 20 is to simply "steal" an existing, valid instance of the mark 52 and to place it into a spoofed email 22. That is, the only action that the spoofer 20 can take with respect to the mark 52 is to copy it.

In the case of a bulk email send (i.e., no individual identifying data like the user ID 114 is included in the mark 52), the spoofer 20 merely needs to get a hold of a single valid email 18 from the organization 16 and then copy the mark 52 from it into a spoofed email 22. But this is where the encrypted data 104 comes in. For one thing, it is likely that the spoofer 20 would need to be able to legitimately decrypt the encrypted data 104 just to see what the topic 110 and even the timestamp 108 are. Getting the public key of the organization 16 for this is not necessarily difficult but generally requires getting to someone who has gotten that key legitimately. Assuming the spoofer 20 can know the topic 110, the spoofer 20 will then have to craft the spoofed email 22 to come as close to the topic 110 as possible, or else risk raising flags by the end users 14. And because there is (or should be) a fairly small valid time interval (which is configurable on a per originator basis), the spoofer 20 also needs to act quickly or else the time alarm will go off, again raising suspicion.

When the optional user ID 114 is added, the burden on the spoofer 20 increases considerably more. The spoofer 20 still needs to circumvent the barriers above, but now, even harder, the spoofer 20 has to intercept an email 18 for each user 14 that the spoofer 20 is trying to spoof (and to then map the mark 52 to each email address, etc.). This becomes a much more difficult task. Intercepting one email 18 in the bulk case is not hard and, in fact trivial, if the spoofer 20 is also a valid user 14, but intercepting an email 18 for each user is likely to be virtually impossible. Hence, if the organization 16 can do it, it is preferred to include the user ID 114 in the mark 52.

In a typical deployment of the anti-spoofing system 50 a user 14 will likely receive authentic emails 18 from many different source organizations 16. Therefore, the client software 54 preferably should to be able to support multiple public keys and their mappings for each different source the organization 16. An easy way to do this is to make the OID 102 be the broad domain name of the organization 16 (e.g., com.sigaba, edu.mit, etc.), since the goal here is merely to avoid conflicts.

An entry in the local registry of the machine of the user 14 can map the OID 102 to the formal name of the sending organization 16; the public key of that organization 16; and a timestamp interval alarm. Optionally, other values that can be stored are the user ID 114 by which the user 14 is known to the organization 16; and a location of a file containing the image data returned for the HTTP GET (when not otherwise present, a default branded image can be used). The OID 102 is included in the mark 52 in the clear (perhaps as a separate HTTP query parameter to separate it from the encrypted data).

Before a user 14 can know whether an email 18 is authentic they must have installed the public key (at least) of the sending organization 16. When an OID mapping in the registry of the machine of the user 14 is used, as described above, an easy way to do this is to create a new file type (.acd—Authenticity Checking Data) and to associate this with the software 54 (the installation process can make this association). A sending organization 16 can then simply host a file of this type somewhere on their web site (e.g., on an SSL protected page, so that the file is only obtainable via HTTPS). When the user 14 clicks on a link that causes this file to be downloaded, the trusted software 54 receives and process that file. The are software 54 merely needs to open the file, verify the integrity (perhaps checking a signature chaining back to a VERISIGN (TM) certificate) and makes the entries in the registry.

One problem with associating a file type, however, is that it becomes easy for a spoofer 20 to email a file of the same file type and override a legitimate OID 102 with a bogus one. Therefore, a safer alternative is to force the user 14 to go through the trusted software 54 in order to get the data. For example, the user 14 could right click on the taskbar icon and select something like "Import new authenticity data." This would prompt for a URL (which could be cut and pasted from an email or a web site). The software 54 can then make an SSL connection to the web site and download the file directly. The software 54 can also compare the name in the SSL certificate with the OID data to make sure they match up. This will prevent a spoofer 20 from overriding or masquerading as a legitimate originator.

From a completeness perspective, the user 14 should also be able to list all authenticity data and to delete entries that are no longer wanted. Additionally, this approach can support each sending organization 16 setting a preferred window for the timestamp alarm. Designers of embodiments of the anti-spoofing system 50 will also typically want to allow users 14 to override the time interval since different users 14 use email differently. In this case, if an override value is set, it can override all other values.

Detecting Spoofed Hyperlinks

An alternative to authenticating the entire message (e.g., the email 18 containing the mark 52) is to simply authenticate an embedded link within a message at the point that the link is activated by the user 14, and to notify the user 14 appropriately.

Figure 5:
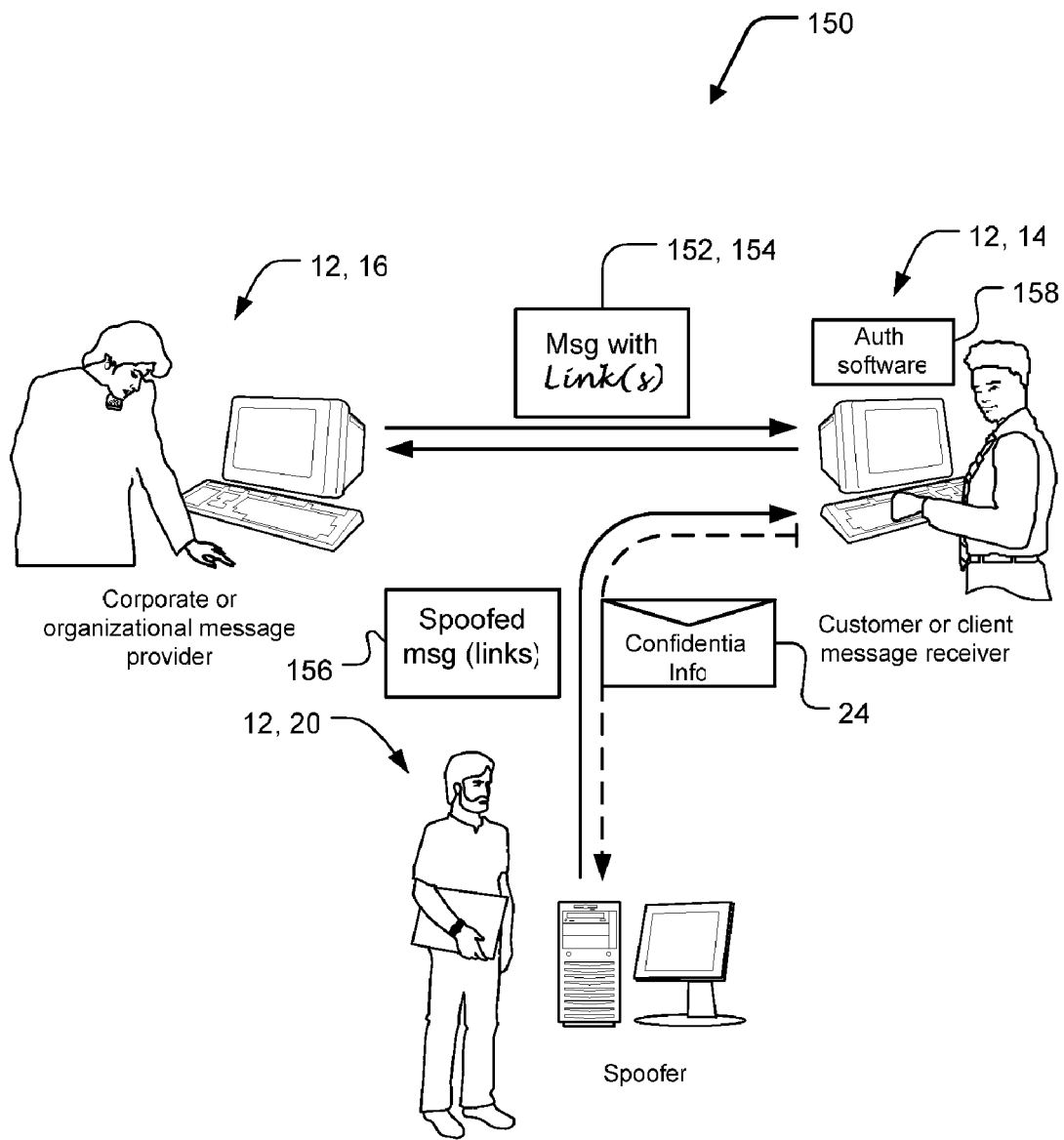
FIG. 5 is a block diagram depicting another anti-spoofing system in a usage scenario, here in a more general messaging context.

FIG. 5 is a block diagram depicting another anti-spoofing system 50 in a usage scenario, here in a more general messaging context. This is similar to the anti-spoofing system 50 in FIG. 2 in many respects, and the same references are therefore used where appropriate. The general idea here is that the organization 16 can provide a message 152 that includes one or more authenticity links 154 to the user 14, and when the spoofer 20 here provides a spoofed message 156 (including on or more spoofed conventional links) in an attempt to mislead the user 14 the anti-spoofing system 150 can detect this. The message 152 here may be the same as the email 18 with the mark 52, as already discussed, but may be more generalized, e.g., an instant message (IM) or a link at a web site. The presence of the link 154 in the message 152 here triggers a piece of trusted software (software 158) running on the local machine of the user 14, which is able to determine whether the link 154 authentic and conveys that information to the user 14.

Much as already described for the email IS and the mark 52, the organization 16 here constructs its message 152 and includes one or more links 154 in it. If the message 152 is to be in HTML, a link 154 can be hidden in an <img> tag (which can also cause checking to proceed automatically), or behind a button (which can be an image) or as just a regular link. If the message 152 is to be in plain text, the link 154 can be included as an actual URL, and the machine of the user 14 can convert the link 154 to a live link. At worst, the user 14 here has to cut and paste the link 154 as a URL into their browser for execution. In all of these cases, the software 158 processes the link 154.

The basic concept here is that when the link 154 is activated, the user 14 is notified via a (passing) dialog whether the link 154 was "signed" by the organization 16 that provided the message 152. If the user 14 does not see a familiar indicator dialog that they have come to expect, through education, they should then regard the link as counterfeit and unrelated to the trusted organization 16.

The experience of the user 14 can still be that all of the links 154 in the message 152 appear exactly as they normally would (e.g., hidden by an image or a text label), and all of the links 154 in each message 152 can be protected (as discussed presently), and the user 14 here as well sees an assuring window or dialog displayed on the screen of their machine. This window or dialog can include the name of the organization 16 (which will typically be owner of the key used to decrypt the link 154) and the domain name of the target URL in the link 154. By displaying the owner name, the user 14 should be able to correlate the link 154 with the organization 16 sending of the message 152, and the domain name serves for reassurance and further confirmation purposes.

In many implementations a better experience for the user 14 is to display an animation in a window on their machine that shows, for instance, a logo in motion along with an indication that the link 154 is authentic. Thus, clicking on a link 154 for Bank of XYZ could show a short animation indicating that the link 154, in fact, leads to a Bank of XYZ web site. The organizations 16 might also choose to use an animation and a sound clip (e.g., a sound type trademark).

Each organization 16 can be assigned a unique identifier (e.g., the OID 102 also used in the anti-spoofing system 50) and can create or be assigned its own, unique public/private key pair (key). The organization 16 then provides the users 14 with (1) a copy of the software 158, if a user 14 does not already have it; (2) its OID 102; and (3) the particular public key that the organization 16 has designated for communications of its messages 152.

Authentication of the links 154 embedded in a message 152 here works similar to the authentication of a mark 52 in an email 18 (the approach already described, above). The software 158 can again be a simple HTTP proxy process that listens at IP address 127.0.0.1 on some well-known port. Each authentic link 154 in a message 152 can then be encoded as "http://127.0.0.1:port?o=oid&t=encoded-url" where "oid" is a clear text string representing the originator ID (OID 102) and the "encoded-url" is the target URL, encrypted and URL-encoded. The encoded URL is encrypted with the private key of the originating organization 16, and the public key is distributed to the users 14 in any of various manners. The display animation, discussed above, can also be distributed along with the public key (and thus specifically "branded" to an organization 16). Note that this solution requires no identifying data for the user 14 to be passed outside of their machine.

Figure 6:
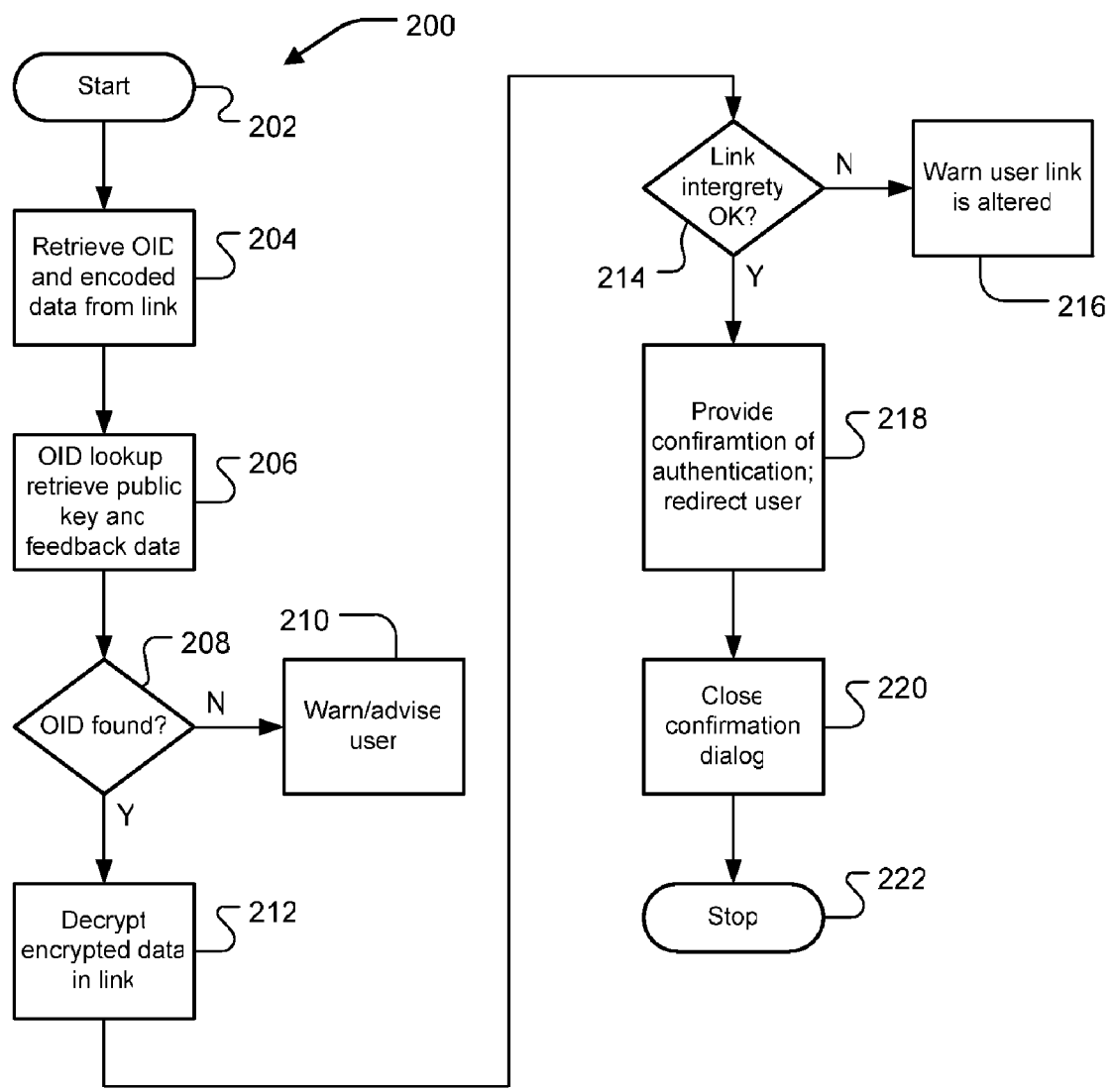
FIG. 6 is flow chart showing a process to work with a link in a message.

FIG. 6 is flow chart showing a process 200 to work with a link 154 in a message 152. The process 200 starts in a step 202, where the user 14 has in some manner received the message 152 on their local machine.

In a step 204, the user 14 clicks on the link 154 in the message 152, and query parameters ("http://127.0.0.1: 2099?o=SomeBank.com&t=A9B76...E77") are passed to the software 158 (e.g., via the web browser the user 14 is using to view the message 152; here, for instance, the software 158 is a simple HTTP proxy server listening at IP address 127.0.0.1 and port 2099, the OID 102 is "SomeBank.com," and "A9B76...E77" is the still encrypted URL for Somebank).

In a step 206, the software 158 starts to process the query parameters. The OID 102 is looked up, to get the public key and success animation (or video, image, sound, etc.) (for Somebank, in this hypothetical example).

In a step 208, a determination is made if the OID 102 is present. If not, in a step 210 the process 200 returns an HTML page indicating that the OID 102 is unknown, and therefore that the connection to the URL should not be trusted or cannot be completed. Information can also be shown as to how to get the OID 102 loaded.

Otherwise, in a step 212, the public key of the organization 16 is used to decrypt and integrity check the encoded URL (taken from the link 154).

In a step 214 a determination is made if there is an integrity problem in the decrypted information from the link 154. If there is, in a step 216 the process 200 returns an HTML page saying that the link 154 has been altered.

Otherwise, in a step 218, the checks are successful and the confirming success animation is presented in an authentication window. Concurrently, the process 200 can redirect the browser of the user 14 to the now decoded URL from the link 154 by returning a HTTP 302 command (Location changed—redirect).

In a step 220, after 30 seconds or when the user 14 manually closes it, the authentication window automatically goes away, and in a step 222 the process 200 is finished Alternatively, instead of encrypting the URL of the organization 16 in the link 154, the organization 16 can simply digitally sign it and include a clear version of it in a list of parameters as the URL in the message 152. In this case, the trusted software 158 verifies (instead of just decrypting) the signature on the target link 152.

While various embodiments have been described above, it should be understood that they have been presented by way of example only, and not limitation.

INDUSTRIAL APPLICABILITY

The present invention, as shown herein by the exemplary anti-spoofing systems 50, 150 is well suited for application in electronic communications of e-mail, other message types, of files, and other information, and thus concurrently providing both high security and high ease of use.

As has been discussed, the invention protects users 14 with multiple layers of decryption to authenticate the marks 52 in emails 18 or the links 154 embedded in messages 152.

A spoofer 20 can try to attack by forging a spoofed email 22 or a spoofed message 156 that do not have the authenticated mark 52 or links 154 (i.e., that has regular links), in the manner presently most commonly used type of spoofing attack. In this scenario, however, the only means of infiltrating the anti-spoofing systems 50, 150 is through human error. This approach necessarily relies completely on the users 14 being both unsuspecting and ignorant of how the anti-spoofing systems 50, 150 work. In this case, even when the software 54, 158 is installed, it will not be triggered. The user 14 must be cognizant of this negative indicator, an absence of a result window, but this requires only a small amount of education. Once a user 14 expects an authenticity dialog window to appear, they will take notice when one does not.

Alternately, a spoofer 20 can try to attack by attempting to include some valid links in a spoofed email 22 or a spoofed message 156 and some invalid (regular) links, hoping that the user will not notice that only some of the links seem to work. Once implemented, however, the fundamental concepts of education and comprehension of the anti-spoofing systems 50, 150 will protect against this, and the user 14 releasing confidential information in a response 24.

A spoofer 20 cannot alter a mark 52 or a link 154 that is encrypted. The spoofer 20 can attempt to get the user 14 to load their own counterfeit OID to public key mapping, but a counterfeit public key is counterproductive because other authenticity checks would reveal inconsistent results and discrepancies, as described above. It thus is not clear spoofers 20 could attain any advantage, especially if organizations 16 control their OIDs 102 by encryption with private keys known only to the organizations 16, and possibly embedding the corresponding public key into the software 54, 158 so that authenticity data for a new OID 102 can be checked.

Alternatively, a spoofer 20 try to could copy the same image/animation and correlate that with a counterfeit OID to make a mark 52 or a link 154 appear valid. To address this issue, all possible DNS names for links that would correspond to an image could be listed and an attachment of the list would be coupled into an encrypted package. For example, valid domains (e.g., bankofXYZ.com) could include the image itself in an encrypted package. Before the image is displayed, the software then verifies that the target of the link is one of the names listed with the image. This prevents the image from being hijacked.

Accordingly, to provide the noted and other advantages, the present invention may now be implemented by those of reasonable skill in the art, creating embodiments using existing technologies if desired, and then the invention may be used by individuals and organizations with ordinary skills and aptitudes.

For the above, and other, reasons, it is expected that the anti-spoofing systems 50, 150 of the present invention will have widespread industrial applicability. Therefore, it is expected that the commercial utility of the present invention will be extensive and long lasting.

What is claimed is:

1. A computer program, embodied on a computer readable storage medium, for assisting a user to determine whether an email comes from a purported originator, the computer program comprising:
    a code segment that determines with a computerized system whether the email includes an authenticity mark including an originator identifier and encrypted data, wherein said encrypted data associated with said authenticity mark does not include payload data;
    a code segment that decrypts said encrypted data based on said originator identifier, into decrypted data;
    a code segment that matches said originator identifier from said authentication mark to one of a plurality of registered originators against a unique identity extracted from said decrypted data;
    a code segment that presents to the user on a display unit:
    whether the email includes said authenticity mark;
    whether said encrypted data decrypts successfully; and
    information based on said authenticity mark and said decrypted data.

2. The computer program of claim 1, wherein the computer program is digitally signed.

3. The computer program of claim 1, wherein said code segment that determines runs as a service in said computerized system.

4. The computer program of claim 1, wherein said code segment that determines includes a hypertext transport protocol (HTTP) server.

5. The computer program of claim 1, wherein said code segment that determines listens at a port in said computerized system for a request for hypertext markup language (HTML) content and extracts said authenticity mark from a uniform resource locator (URL) link requesting said HTML content.

6. The computer program of claim 1, wherein said code segment that presents further presents information to the user based on said originator identifier.

7. The computer program of claim 6, further comprising a code segment that matches said originator identifier to one of a plurality of registered originators maintained in a storage unit, to retrieve a decryption key associated with said originator identifier for use by said code segment that decrypts.

8. The computer program of claim 1, wherein:
    said code segment that determines compares a checksum from said authenticity mark against contents of the email; and
    said code segment that presents further presents to the user information based on said checksum.

9. The computer program of claim 1, wherein said code segment that decrypts employs a public key of said purported originator.

10. The computer program of claim 1, wherein:
    said code segment that decrypts extracts at least one of a timestamp, a topic, and a user identifier from said encrypted data; and
    said code segment that presents further presents to the user information based on at least one of said timestamp, said topic, and said user identifier.

11. The computer program of claim 10, further comprising a code segment that compares said timestamp to preset timeliness criteria; and wherein said code segment that presents emphasizes said information based on said timestamp when said timeliness criteria are deviated from.

12. The computer program of claim 1, wherein said code segment that presents employs a dialog box that only software running locally in said computerized system can provide, thereby avoiding confusion with a remotely generated browser window.

13. A system for assisting a user to determine whether an email comes from a purported originator, the system comprising:
    a computerized system having a display unit;
    a logic in said computerized system that determines whether the email includes an authenticity mark including an originator identifier and encrypted data, wherein said encrypted data associated with said authenticity mark does not include payload data;
    a logic in said computerized system that decrypts said encrypted data based on said originator identifier, into decrypted data;
    a logic in said computerized system that matches said originator identifier from said authentication mark to one of a plurality of registered originators against a unique identity extracted from said decrypted data;
    a logic in said computerized system that that presents to the user, on said display:
    whether the email includes said authenticity mark;
    whether said encrypted data decrypts successfully; and
    information based on said authenticity mark and said decrypted data.

14. The system of claim 13, wherein said logic in said computerized system that determines runs as a service.

15. The system of claim 13, wherein logic in said computerized system that determines includes a hypertext transport protocol (HTTP) server.

16. The system of claim 13, wherein said logic in said computerized system that determines listens at a port for a request for hypertext markup language (HTML) content and extracts said authenticity mark from a uniform resource locator (URL) link requesting said HTML content.

17. The system of claim 13, wherein said logic in said computerized system that that presents to the user further presents information based on said originator identifier.

18. The system of claim 17, further comprising a logic in said computerized system that matches said originator identifier to one of a plurality of registered originators maintained in a storage unit, to retrieve a decryption key associated with said originator identifier for use by said logic in said computerized system that decrypts.

19. The system of claim 13, wherein:
    said logic in said computerized system that determines compares a checksum from said authenticity mark against contents of the email; and said logic in said computerized system that that presents to the user further presents information based on said checksum.

20. The system of claim 13, wherein said logic in said computerized system that decrypts employs a public key of said purported originator.

21. The system of claim 13, wherein:
said logic in said computerized system that decrypts extracts at least one of a timestamp, a topic, and a user identifier from said encrypted data; and
said logic in said computerized system that that presents to the user further presents information based on at least one of said timestamp, said topic, and said user identifier.

22. The system of claim 13, further comprising a logic in said computerized system that compares said timestamp to preset timeliness criteria; and wherein said logic in said computerized system that that presents to the user emphasizes said information based on said timestamp when said timeliness criteria are deviated from.

23. The system of claim 13, wherein said logic in said computerized system that that presents to the user employs a dialog box that only software running locally in said computerized system can provide, thereby avoiding confusion with a remotely generated browser window.

24. A method for assisting a user to determine whether an email comes from a purported originator, the method comprising:
determining whether the email includes an authenticity mark including an originator identifier and encrypted data, wherein said encrypted data associated with said authenticity mark does not include payload data;
decrypting said encrypted data based on said originator identifier, into decrypted data; a code segment that matches said originator identifier from said authentication mark to one of a plurality of registered originators against a unique identity extracted from said decrypted data;
presenting to the user:
whether the email includes said authenticity mark;
whether said encrypted data decrypts successfully; and
information based on said authenticity mark and said decrypted data.

25. The method of claim 24, wherein said determining includes running a service in a computerized system.

26. The method of claim 24, wherein said determining includes running a hypertext transport protocol (HTTP) server.

27. The method of claim 24, wherein said determining includes listening at a port in a computerized system for a request for hypertext markup language (HTML) content and extracting said authenticity mark from a uniform resource locator (URL) link requesting said HTML content.

28. The method of claim 24, wherein:
said determining further includes extracting an originator identifier from said authenticity mark; and
said presenting further includes presenting information to the user based on said originator identifier.

29. The method of claim 28, further comprising matching said originator identifier to one of a plurality of registered originators and retrieving a decryption key associated with said originator identifier for use in said decrypting.

30. The method of claim 24, wherein:
said determining includes comparing a checksum from said authenticity mark against contents of the email; and
said presenting includes presenting information based on said checksum.

31. The method of claim 24, wherein said decrypting employs a public key of said purported originator.

32. The method of claim 24, wherein:
said decrypting extracts at least one of a timestamp, a topic, and a user identifier from said encrypted data; and
said presenting includes presenting information based on at least one of said timestamp, said topic, and said user identifier.

33. The method of claim 32, further comprising comparing said timestamp to preset timeliness criteria; and wherein said presenting emphasizes said information based on said timestamp when said timeliness criteria are deviated from.

34. The method of claim 24, wherein said presenting employs a dialog box that only software running locally in a computerized system can provide, thereby avoiding confusion with a remotely generated browser window.

* * * * *